Figure 3:
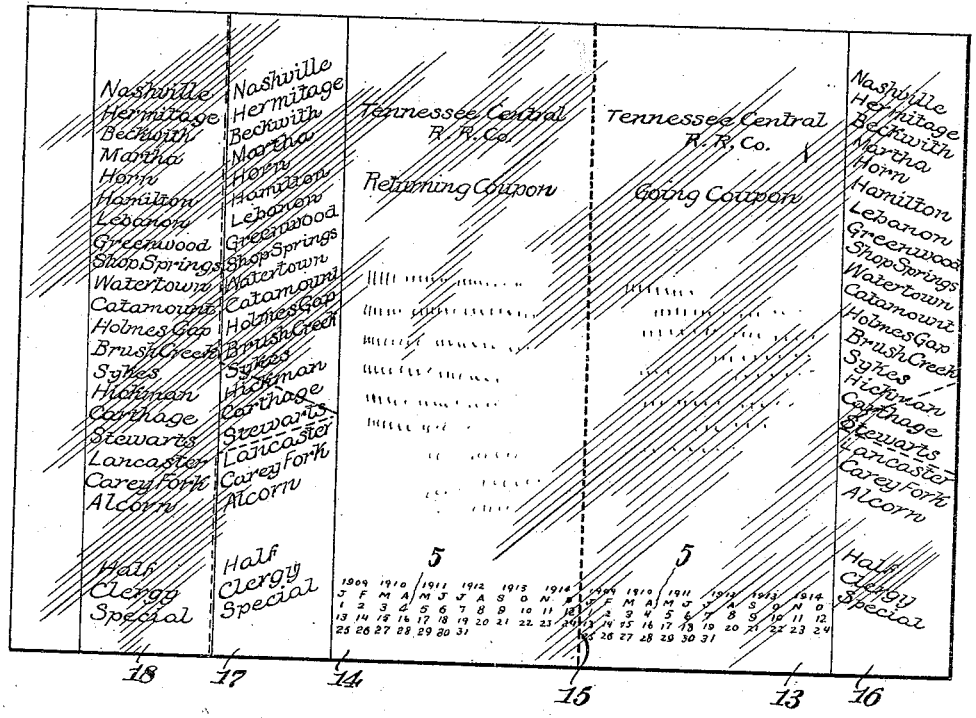

T. A. ROUSSEAU.
RAILROAD TICKET.
APPLICATION FILED JAN. 21, 1909.

944,995.

Patented Dec. 28, 1909.

Witnesses

Inventor
Theodore A. Rousseau.
By Dudley, Browne & Phelps
Attorneys

T. A. ROUSSEAU.
RAILROAD TICKET.
APPLICATION FILED JAN. 21, 1909.

944,995.

Patented Dec. 28, 1909.
2 SHEETS—SHEET 2.

Witnesses

Inventor
Theodore A. Rousseau
By Dudley, Browne & Phelps,
Attorneys

UNITED STATES PATENT OFFICE.

THEODORE A. ROUSSEAU, OF NASHVILLE, TENNESSEE.

RAILROAD-TICKET.

944,995.　　　　Specification of Letters Patent.　　Patented Dec. 28, 1909.

Application filed January 21, 1909. Serial No. 473,540.

*To all whom it may concern:*

Be it known that I, THEODORE A. ROUSSEAU, a citizen of the United States, residing at Nashville, in the county of Davidson and State of Tennessee, have invented certain new and useful Improvements in Railroad-Tickets, of which the following is a specification.

My invention relates to that class of tickets which are formed from blanks having the names of a series of stations printed upon them in two parallel adjacent columns, and which are adapted to be so torn in two, or otherwise separated longitudinally of said column as to form a stud and a ticket portion proper, each portion having upon it, in whole or in part, one of the columns of names, and having the name of the destination station indicated by a tear extending parallel to the name for its full length, either immediately above or immediately below said name, whereby the name of the destination is clearly indicated. The name of the starting station, or station from which the ticket is sold, is written or printed upon the body of the ticket, so that when the ticket is issued it reads from such station to the particular station indicated by the tear extending parallel to such station just above or below the same.

The separation of the ticket blank into a stub portion and a ticket portion proper with the destination station indicated upon each in the above manner is effected by tearing the blank in two against a ruler or tearing blade having a projecting tongue which will cause the tear to extend parallel to the entire name of the destination station on the ticket portion. In order to enable the ticket to be torn against the tongue so as to have the tear extend parallel with the entire name of the destination, it is necessary that the name of the destination on the ticket portion to be printed at an angle to the line of tear between the ticket portion and the stub, the angle being an acute angle or an obtuse angle, but not a right angle. Preferably, and as shown, the station names are printed on the stub in a column with the names or designations at right angles to the line of tear between the portions of the ticket.

With these and other objects in view my invention consists in certain combinations and arrangement of parts, several of the many forms of which will be first described in connection with the accompanying drawings, and then the invention particularly pointed out in the claims.

Figure 4:
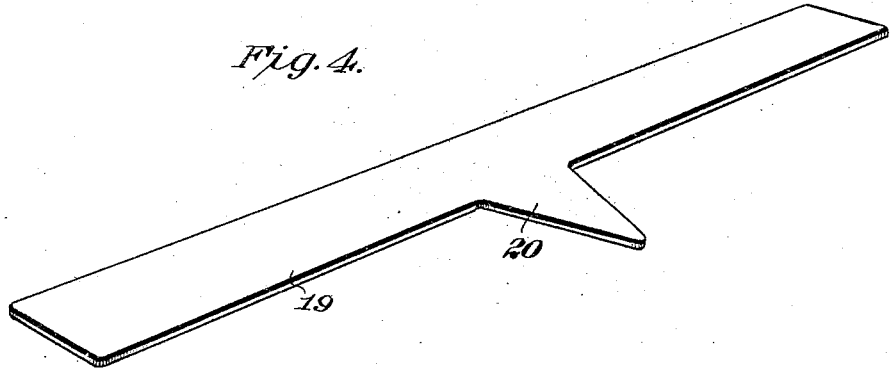

Referring to the drawings wherein the same part is designated by the same reference character wherever it occurs, Figure 1 shows a ticket blank with the line of tear indicated by dotted lines; Fig. 2 shows a blank having a double column of station names; Fig. 3 shows a blank adapted for use as a return trip ticket, and Fig. 4 illustrates one form of tearing knife or cutter for use in connection with these tickets.

Referring to the form of construction shown in Fig. 1, 1 is the ticket proper and 2 the agent's stub. These parts are adapted to be separated along the line 3. The portion 1 is provided with the column 4 in which is printed the usual contract, the name of the starting station and preferably a series of month and date indications, as indicated at 5, which may be punched by the ticket agent to limit the time within which the ticket may be used.

At the side of the column 4 is a column 6 in which are printed the names or designations of the stations as indicated at 7, the names of the stations being arranged at an angle to the printed matter in the column 4. The agent's stub is provided with a column 8 in which are printed the names of the stations as indicated at 9, in the same order that they appear in the column 6, but the names being parallel to the printed matter in the contract 1, so that they are at an angle to the names of the stations in the column 6. The first letter of each of the station names 9 starts directly opposite the end of the station name in the column 6. Below the list of stations 7 may be arranged the words "Half", "Clergy", "Special" as indicated at 10, with the corresponding words at the bottom of the column 8, as indicated at 11. It is also preferable to have a space on the agent's stub in the column 8 for the number of the clergyman's permit, as indicated at 12.

Referring to the form of ticket shown in Fig. 2, which is composed of a contract portion 4 printed therein and the date portion 5 at the bottom thereof, a column 6 at each side of the contract portion, each of said columns having the stations 7 printed therein, half the stations being printed in one of the columns and half in the other, whereby the capacity of the ticket is doubled, and outside of each of the columns 6 an agent's stub 2 having the station columns 8 corresponding to the station columns 6, with the stations 9 printed therein as described in connection with Fig. 1. In other words the form of ticket shown in Fig. 2 is the same as that shown in Fig. 1, with a column 6 on each side of the contract and an agent's stub outside of each of the columns 6 instead of on one side as is shown in Fig. 1.

Referring to Fig. 3 in which is shown a return trip ticket printed in accordance with my invention, there are two columns 13 and 14, one being the going coupon and the other the returning coupon, with a line of perforations 15 between said coupons, a column 16 on the side of the going coupon, a column 17 on the side of the returning coupon, and an agent's stub 18 beside the column 17. The columns 16 and 17 have the stations printed therein in duplicate and arranged at an angle as previously described, so that when the ticket is folded on the line 15 the names of the stations in the two columns 16 and 17 will be back to back and register.

In the use of any of the forms of ticket previously described, a cutter of the form for instance shown in Fig. 4 is used and, as there shown, said cutter comprises a straight edge 19 having a projecting tongue 20 formed thereon, the angle of the cutting edges of the tongue corresponding to the names of the stations on the passenger's stub of the ticket, so that when the ticket is torn the passenger's stub will be torn on a line parallel to the name of the designation, as is shown in dotted lines 22, in each of Figs. 1, 2 and 3. By making the tear extend as shown in these figures there can be no possibility of misunderstanding what designation is intended, as frequently happens where the designation is indicated by merely a notch or a projecting tongue, as has heretofore been done.

Another advantage of my ticket is that all the reading matter thereon can be read with the ticket in one position, and that all the tearing of the ticket can be made by merely moving the cutting edge over the ticket so that the tickets can be arranged by the station agent in a pile, and where a plurality of tickets are desired for the same destination can all be torn at a single operation.

The form of cutter or tearing blade shown in this application forms no part of my invention and is merely shown to illustrate the use of the ticket, it being understood that any other construction of tearing blade desired may be used.

I realize that considerable variation is possible in the details of construction and arrangement of parts without departing from the spirit of my invention, and I therefore do not intend to limit myself to the specific form shown and described.

What I claim as new and desire to secure by Letters Patent is—

1. A railroad ticket formed of a single blank and comprising a ticket section, a column containing station designations located beside the ticket section, an agent's stub located beside said column, said agent's stub containing a column having the same station designations as the first mentioned column of station designations, said columns being arranged adjacent to each other with the designations in one column arranged at an angle to the designations in the other column, the designations in the column of the agent's stub being arranged at right angles to the line between the adjacent columns for the purpose described.

2. A railroad ticket comprising a ticket section, a column located on each side of said ticket section containing station designations, an agent's stub located beside one of said columns, said agent's stub containing a column having the same station designations as the column on the ticket section beside which the stub is located, said last two mentioned columns being arranged adjacent to each other with the station designations in one column arranged at an angle to the station designations in the other column, the designations in the column of the agent's stub being arranged at right angles to the line between adjacent columns for the purpose set forth.

3. A railroad ticket comprising a ticket section, a column containing station designations on each side of the ticket section, an agent's stub beside each column of station designations, each of said agent's stubs containing a column adjacent to the column on the ticket section and having the same station designations as the station designations of the adjacent column on the ticket section, the station designations in the columns of the agent's stubs and in the columns of the ticket section being arranged at an angle to each other, the designations in the columns of each of the agent's stubs being arranged at right angles to the line between the adjacent columns for the purpose set forth.

In testimony whereof I affix my signature in presence of two witnesses.

THEODORE A. ROUSSEAU.

Witnesses:
R. A. CHADWICK,
F. M. HENDERSON.